United States Patent
Pydimarry et al.

(10) Patent No.: US 8,880,380 B2
(45) Date of Patent: Nov. 4, 2014

(54) CRASHWORTHINESS DESIGN METHODOLOGY USING A HYBRID CELLULAR AUTOMATA ALGORITHM FOR THE SYNTHESIS OF TOPOLOGIES FOR STRUCTURES SUBJECT TO NONLINEAR TRANSIENT LOADING

(75) Inventors: Kishore K. Pydimarry, Dublin, OH (US); Duane T. Detwiler, Powell, OH (US); John E. Renaud, Niles, MI (US); Neal M. Patel, Pottstown, PA (US); Byungsoo Kang, Irvine, CA (US); Chandan K. Mozumder, Mishawaka, IN (US)

(73) Assignees: Honda Motor Co., Ltd., Tokyo (JP); The University of Notre Dame Du Lac, Notre Dame, IN (US)

( * ) Notice: Subject to any disclaimer, the term of this patent is extended or adjusted under 35 U.S.C. 154(b) by 917 days.

(21) Appl. No.: 12/340,192

(22) Filed: Dec. 19, 2008

(65) Prior Publication Data
US 2009/0164178 A1    Jun. 25, 2009

Related U.S. Application Data

(60) Provisional application No. 61/016,311, filed on Dec. 21, 2007.

(51) Int. Cl.
| | | |
|---|---|---|
| G06F 17/50 | (2006.01) | |
| G06F 17/10 | (2006.01) | |
| G06G 7/48 | (2006.01) | |
| G06T 15/00 | (2011.01) | |
| G06T 17/00 | (2006.01) | |
| G06F 19/00 | (2011.01) | |

(52) U.S. Cl.
CPC ............ *G06F 17/50* (2013.01); *G06F 17/5018* (2013.01); *G06F 17/5095* (2013.01); *G06F 2217/06* (2013.01)

USPC ........... 703/1; 703/2; 703/7; 703/8; 345/419; 345/420; 700/97; 700/98

(58) Field of Classification Search
CPC ............ G06F 17/5018; G06F 17/5095; G06F 2217/16; G06F 2217/06; G06T 15/40
USPC .......................................................... 703/1
See application file for complete search history.

(56) References Cited

U.S. PATENT DOCUMENTS

| | | | |
|---|---|---|---|
| 6,708,141 B1 * | 3/2004 | Schaff et al. ...................... | 703/2 |
| 6,907,391 B2 * | 6/2005 | Bellora et al. .................... | 703/8 |

(Continued)

OTHER PUBLICATIONS

Andres Tovar et al ("Hybrid Cellular Automata: a biologically-inspired structural optimization technique" 10th AIAA/ISSMO Multidisciplinary Analysis and Optimization Conference Aug. 30-Sep. 1, 2004, pp. 1-15).*

(Continued)

*Primary Examiner* — Akash Saxena
(74) *Attorney, Agent, or Firm* — Fenwick & West LLP; Mark E. Duell (57) ABSTRACT

Crashworthiness designing of a structure using a Hybrid Cellular Automata (HCA) algorithm where field states are computed using finite element analysis (FEA) and the material distribution of the structure is updated at each iteration using cellular automata method. The HCA algorithm optimizes the topology of the structures to achieve certain performance within the limits of various constraints applied to ensure crashworthiness of the structures. The HCA algorithm may also be applied to designing of structures to be fabricated by an extrusion method having the same cross section along the direction of extrusion or stamped structures having thickness varying across the structure.

13 Claims, 6 Drawing Sheets

(56) References Cited

U.S. PATENT DOCUMENTS

| | | | |
|---|---|---|---|
| 6,941,250 B1* | 9/2005 | Nishiwaki et al. | 703/1 |
| 7,509,183 B2* | 3/2009 | Lin et al. | 700/97 |
| 7,640,146 B2* | 12/2009 | Nutwell et al. | 703/2 |
| 8,126,684 B2* | 2/2012 | Goel et al. | 703/1 |
| 8,335,668 B2* | 12/2012 | Taggart et al. | 703/1 |
| 8,606,844 B2* | 12/2013 | Kaufman et al. | 709/201 |
| 2007/0075450 A1* | 4/2007 | Belegundu et al. | 264/40.1 |
| 2007/0239411 A1* | 10/2007 | Yamashita et al. | 703/7 |
| 2007/0295700 A1* | 12/2007 | Nutwell et al. | 219/109 |
| 2008/0300831 A1* | 12/2008 | Taggart et al. | 703/1 |
| 2009/0164178 A1* | 6/2009 | Pydimarry et al. | 703/1 |
| 2009/0198476 A1* | 8/2009 | Kim et al. | 703/2 |
| 2010/0262406 A1* | 10/2010 | Goel et al. | 703/2 |
| 2011/0137443 A1* | 6/2011 | Farahani | 700/98 |
| 2011/0166833 A1* | 7/2011 | Taggart et al. | 703/1 |
| 2011/0270587 A1* | 11/2011 | Yamada et al. | 703/1 |
| 2012/0232685 A1* | 9/2012 | Wang et al. | 700/98 |
| 2013/0247360 A1* | 9/2013 | Belegundu et al. | 29/592 |

OTHER PUBLICATIONS

Neal Patel et al ("Crashworthiness Design using a Hybrid Cellular Automaton Algorithm", ASME 2006 Conference, Sep. 10-13, 2006, pp. 1-12).*

Andres Tovar (Tovar-2 hereafter) ("Hybrid cellular automata with local control rules: a new approach to topology optimization inspired by bone functional adaptation", 6th World Conference of Structural and Multidisciplinary Optimization, May 30 Jun. 3 2005, p. 1-11.*

M.M. Abdalla et al ("Structural design using Cellular Automata for eigenvalue problems", Springer Verlag 2003 pp. 1-9).*

Topology Optimization for Synthesizing Extrusion Based Nonlinear Transient Designs; Chandan Mozumder et al, ASME 2007 International Design Engineering Technical Conferences & Computers and Information in Engineering Conference Sep. 4-7, 2007; pp. 1-16.*

"Thickness Based Topology Optimization for Crashworthiness Design Using Hybrid Cellular Automata"; Chandan Mozumder, University of Notre Dame; Punit Bandi, University of Notre Dame; Neal Patel, University of Notre Dame; John Renaud, University of Notre DameChapter DOI: 10.2514/6.2008-6046 Publication Date: Sep. 10-12, 2008; pp. 1-14.*

Topology Optimization of Compliant Mechanisms Using the Homogenization Method by Shinji Nishiwaki et al; International Journal for Numerical Methods in Engineering Int. J. Numer. Meth. Engng. 42, pp. 535-559 (1998).*

An integrated approach for shape and topology optimization of shell structures by Ruben Ansola et al; Computers and Structures 80 (2002) pp. 449-458.*

Mozumder, C., Bandi, P., Patel, N. M., and Renaud, J. E., "Thickness based Topology Optimization for Crashworthiness Design using Hybrid Cellular Automata," Proceedings of the 12th AIAA/ISSMO Multidisciplinary Analysis and Optimization Conference, Sep. 10-12, 2008, pp. 1-14.

Patel, N., et al., "Crashworthiness Design Using a Hybrid Cellular Automation Algorithm," Proceedings of ASME 2006 International Design Engineering Technical Conferences & Computers and Information in Engineering Conference, Sep. 10-30, 2006, Philadelphia, Pennsylvania, U.S.A., pp. 1-12.

Patel, N. M., Mozumder, C., and Renaud, J. E., "Topology Optimization for Synthesizing Extrusion based Nonlinear Transient Design," Proceedings of the ASME International Design Engineering Technical Conferences and Computers and Information in Engineering Conference, Sep. 4-7, 2007, pp. 1-16.

Patel, N. M., Crashworthiness Design using Topology Optimization, Ph.D. thesis, University of Notre Dame, Indiana, Aug. 2007, 199 Pages.

Patel, N. M., Kang, B., and Renaud, J. E., "Topology Synthesis of Structures under Impact Loading using a Hybrid Cellular Automaton Algorithm," Proceedings of the 11th AIAA/ISSMO Multidisciplinary Analysis and Optimization Conference, Sep. 6-8, 2006. pp. 1-19.

Patel, N.M., Kang, B., Renaud, J.E., Tovar, A, 2006, "Multilevel Crashworthiness Design using a Compliant Mechanism Approach", AIAA-2006-2056, pp. 1-14, Proceedings of the 47th AIAA/ASME/ASCE/AHS/ASC Structures, Structural Dynamics & Materials Conference, Newport, Rhode Island, May 1-4.

* cited by examiner

CRASHWORTHINESS DESIGN METHODOLOGY USING A HYBRID CELLULAR AUTOMATA ALGORITHM FOR THE SYNTHESIS OF TOPOLOGIES FOR STRUCTURES SUBJECT TO NONLINEAR TRANSIENT LOADING

CROSS-REFERENCE TO RELATED APPLICATIONS

This application claims priority under 35 U.S.C. §119(e) to U.S. Provisional Patent Application No. 61/016,311 entitled "A Crashworthiness Design Methodology Using a Hybrid Cellular Automata Algorithm for the Synthesis of Topologies for Structures Subject to Nonlinear Transient Loading" filed on Dec. 21, 2007, which is incorporated by reference herein in its entirety.

GOVERNMENT FUNDING

This invention was made with government support under Grant #1R49CE000789-01 awarded by Center for Disease Control and Prevention (CDC). The government has certain rights in the invention.

FIELD OF THE INVENTION

This disclosure is related to a method and system for designing structures subject to nonlinear transient loads, more specifically to a method and system for crashworthiness designing structures using Hybrid Cellular Automata (HCA) algorithm.

BACKGROUND OF THE INVENTION

Crashworthiness design methodologies combine crash simulation and design methodology in order to design structures in vehicles. A crashworthiness design requires the modeling of complex interactions between components of the vehicles in a crash event. The design of the structures must also accommodate various conflicting criteria such as limiting the maximum acceleration to avoid injuries to and limiting the maximum deformation to avoid injuries attributable to deformed structures penetrating a passenger cabin. Further, the crashworthiness design often requires designing the structures so that the structures absorb as much energy as possible while deforming in a manner that does not cause injury the passengers.

Most commercial software products for designing structures assume that only elastic deformation takes place in the structures. Further, it is assumed that a load is applied to the structures over a long period of time, which results in a steady-state response from the structures. These assumptions, however, become unrealistic for crash events where loads to the structure and boundary conditions change as time progresses. Accordingly, most commercial software products are incapable of performing crashworthiness designing.

Gradient-based method is one of the techniques used in the crashworthiness design. The gradient-based method, however, requires a nonlinear dynamic finite element analysis that is computationally intensive. Therefore, the gradient-based method takes a very long time to design and evaluate the structures. One way to reduce the computation is to simplify the finite element analysis (FEA). But simplifying the finite element analysis will sacrifice the accuracy and reliability of the crashworthiness design.

SUMMARY OF THE INVENTION

Embodiments provide a method, a device and a computer readable storage medium for designing a structure representing a physical object by an optimization process using a Hybrid Cellular Automata (HCA) algorithm where the structure is segmented into a plurality of cells, analyzed by a finite element analysis (FEA), and updated by cellular automata computation. A design variable representing a material distribution in each cell is updated by a material distribution update rule to converge the field state of each cell towards a target field state of each cell. The process of analyzing the structure by the FEA and updating by the cellular automata computation is repeated until a termination condition is satisfied.

In one embodiment, a performance variable representing a property of the structure required to satisfy a performance constraint is calculated. The performance constraint may be associated with forces on the structure and displacements or deformation of the structure. The performance variable may be any property of the structure that is associated with the performance constraint.

In one embodiment, the design variable is a material density of the cell or a thickness of the cell. The material density or the thickness of the cell is updated by the cellular automata based on the field state of the cell to evolve the initial structure into an optimized structure.

In one embodiment, the field state of the cell is the internal energy density of the cell responsive to applying a load to the structure. Crashworthiness designing of a structure involves distributing the internal energy density across the cells as evenly as possible. By obtaining the design of the structure with an even distribution of the internal energy density, all of the cells contribute equally to the absorption of kinetic energy during a crash event. The even distribution of the internal energy density across the cells, therefore, may result in a more crashworthy design of the structure.

In one embodiment, the HCA algorithm is applied to designing a stamped structure with uneven cell thickness. The thickness is employed as a design variable, and is updated by the cellular automata computation.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of this disclosure can be readily understood by considering the following detailed description in conjunction with the accompanying drawings.

DETAILED DESCRIPTION OF THE INVENTION

A preferred embodiment of the present invention is now described with reference to the figures where like reference numbers indicate identical or functionally similar elements.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

Embodiments provide a method, a device and a computer readable storage medium for crashworthiness designing of a structure using a Hybrid Cellular Automata (HCA) algorithm where field states are computed using finite element analysis (FEA) and the material distribution of the structure is updated at each iteration using cellular automata method. The HCA algorithm optimizes the topology of the structures to achieve a target performance within the limits of various constraints applied to ensure crashworthiness of the structures. The HCA algorithm may also be applied to designing of structures to be fabricated by an extrusion method having the same cross section along the direction of extrusion or stamped structures having thickness varying across the structure.

The structures that can be designed using the embodiments include, among others, parts in various types of vehicles (e.g., automobiles, aircrafts, ships), construction elements, consumer products, furniture, construction machines, and safety equipments.

Architecture of Structure Designer

Figure 1:
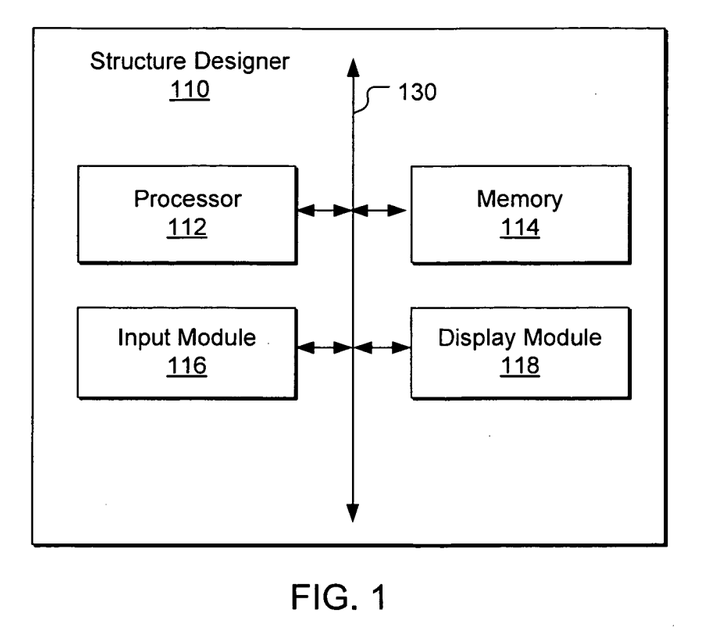
FIG. 1 is a block diagram illustrating a structure designer, according to one embodiment.

FIG. 1 is a block diagram illustrating a structure designer 110, according to one embodiment. The structure designer 110 may be a general purpose computer or a dedicated computer structured to design and evaluate structures using the method disclosed herein. In the embodiment of FIG. 1, the structure designer 110 includes, among other components, a processor 112, a memory 114, an input module 116, a display module 118, and a bus 130 connecting these components. The structure designer 110 may include other components that are omitted herein to avoid obfuscation of the embodiment.

The processor 112 executes instructions stored in the memory 114 to generate the designs of structures and optimize the topologies of the structures. The processor 112 may comprise various computing architectures such as a complex instruction set computer (CISC) architecture, a reduced instruction set computer (RISC) architecture, or an architecture implementing a combination of instruction sets. Although only a single processor is shown in FIG. 1, multiple processors may be included. The processor 112 may comprise an arithmetic logic unit, a microprocessor, a general purpose computer, or some other information appliance equipped to transmit, receive and process data signals from the memory 114.

Figure 2:
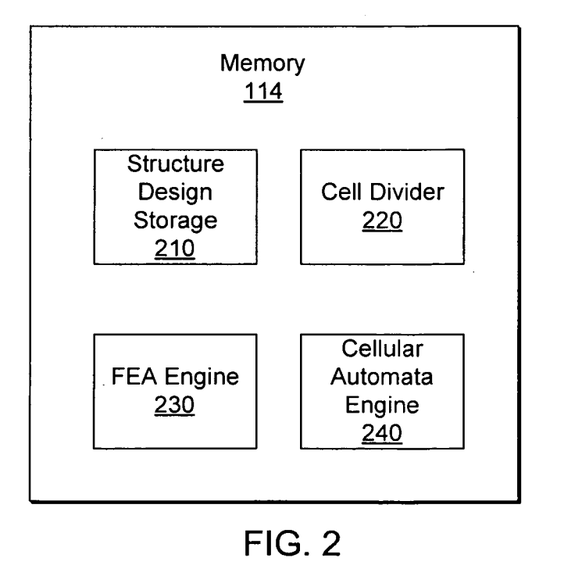
FIG. 2 is a block diagram illustrating a block diagram of a memory in the structure designer of FIG. 1, according to one embodiment.

The memory 114 stores various software components including, among others, a structure design storage 210, a cell divider 220, a finite element analysis (FEA) engine 230, and a cellular automata engine 240. The structure design storage 210 stores the parameters of the structures as they are generated in each iteration of the HCA algorithm processing. The parameters of the designed structures may be stored in the structure design storage 210 for display on the display module 118 or output via other output devices of the structure designer 110. One or more of the components in the memory 114 may be embodied in hardware, software, firmware or any combinations thereof.

The cell divider 220 reads the data of the initial structure from the structure design storage 210 and segments the structure into multiple cells for processing by the FEA engine 230 and the cellular automata engine 240. Specifically, the cells may have uniform size or have non-uniform size. In one embodiment, the FEA engine 230 and the cellular automata engine 240 use the same segmentation or configuration of cells. In another embodiment, the FEA engine 230 and the cellular automata engine 240 use different segmentation or configuration of cells.

The FEA engine 230, in conjunction with the cellular automata engine 240, performs the HCA algorithm. The FEA engine 230 performs numerical analysis on structures by dividing the structure in the current iteration of the HCA algorithm into cells (finite elements), and then computes equations representing the equilibrium of the cells to approximate one or more field states S (e.g., stress, strain and internal energy density) associated with the structure. In one embodiment, LS-Dyna available from Livermore Software Technology Corporation (LSTC) at Livermore, Calif. is used as the FEA engine 230.

The cellular automata engine 240 updates a design variable x representing a material distribution for a cell in the structure based on a material distribution rule that takes into account the field state of neighborhood cells. The state $\alpha_i^{(k)}$ of ith cell in a kth iteration of the HCA algorithm may be expressed by the following equation:

$$\alpha_i^{(k)} = \left\{ \begin{array}{c} S_i^{(k)} \\ x_i^{(k)} \end{array} \right\} \qquad \text{Equation (1)}$$

where $S_i^{(k)}$ represents a set of field states, and $x_i$ represents the design variable of ith cell in the structure. The basic idea of the HCA algorithm is to compute the field state $S_i^{(k)}$ using the FEA engine 230 while updating the design variable $x_i$ using the cellular automata engine 240. The HCA algorithm differs from a general cellular automata algorithm in that the information of the field state $S_i^{(k)}$ is calculated from a global analysis (e.g., finite element analysis) and then used to adjust the design variable $x_i$.

In one embodiment, the design variable $x_i$ for ith cell represents one of the following material properties associated with the structure: density ($\rho$), elastic modulus (E), yield stress ($\sigma_Y$), strain-hardening, and modulus ($E_h$). The design variable $x_i$ may be scaled to have a value not less than 0 and not larger than 1 ($0 \leq x_i \leq 1$). In this example, $x_i=0$ means that ith cell is a void whereas $x_i=1$ means that the cell is full of material. Any values between 0 and 1 means that the cell is partly filled with the material. In another embodiment, the design variable $x_i$ for ith cell represents the thickness of the cell, as described below in detail with reference to stamped structures.

Method of Designing a Structure Using HCA Algorithm

Figure 3:
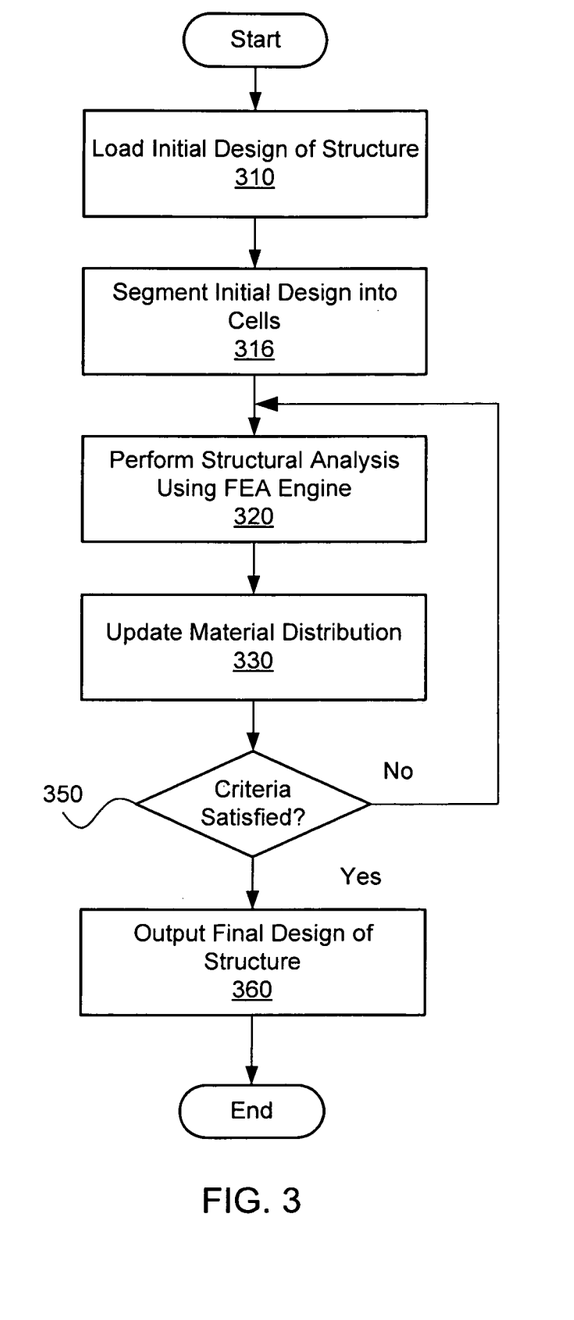
FIG. 3 is a flow chart illustrating a method of designing a structure using a Hybrid Cellular Automata (HCA) algorithm, according to one embodiment.

FIG. 3 is a flow chart illustrating a method of designing a structure, according to one embodiment. First, an initial design of the structure is loaded 310 into the cell divider 220. The structure is then segmented 316 into a plurality of cells by the cell divider 220. The information about the structure and its segmentation is then fed into the FEA engine 230 to perform 320 a conventional structural analysis. In one embodiment, transient nonlinear finite element analysis is used to perform the structural analysis. The FEA engine 230 determines, among others, the field states $S_i^{(k)}$ as a result of the structural analysis.

The result of the structural analysis is then provided to the cellular automata engine 240 together with information about the structure and its segmentation of the cells. The cellular automata engine 240 then updates 330 the material distribution of the structure according to a material distribution rule. Specifically, the design variable $x_i$ of each cell in the structure is updated according to the material distribution rule. In one embodiment, the distribution of material in the structure is updated to evolve the initial design of the structure over multiple iterations into a final structure with cells have approximately the same internal energy density. By obtaining the design of the structure with even distribution of the internal energy density, all of the cells contribute equally to absorption of kinetic energy during a crash event. The even distribution of the internal energy density across the cells, therefore, may result in a more crashworthy design of the structure.

In one embodiment, proportional, integral and derivative (PID) feedback is used to reduce the oscillatory behavior of the design variable $x_i$ from one iteration of the HCA algorithm to the next. The change in the design variable $x_i$ of ith cell at kth iteration of the HCA algorithm using the PID feedback may be expressed in the following equation:

$$\Delta x_i^{(k)} = K_p e_i^{(k)} + K_i \int_{k-2}^{k} e_i^{(k)} d\kappa + K_d \Delta e_i^{(k)} \qquad \text{equation (2)}$$

where $K_p$ is a proportional control gain, $K_i$ is an integral control gain, $K_d$ is the derivative gain, $e_i^{(k)}$ is the error between the average field state of the cell $\bar{S}_i^{(k)}$ and a target field state of the cell $S*_i^{(k)}$. The error $e_i^{(k)}$ in equation (2) can be expressed as:

$$e_i^{(k)} = \bar{S}_i^{(k)} - S*_i^{(k)} \qquad \text{equation (4)}$$

The target field state refers to the field state attempted to be reached in the current iteration. The target field state may be changed at each iteration based on, for example, the field states of the cells in the structure. The target field stat is caculated based on a target fractional mass provided by a user.

Although the integral error in equation (2) is limited to the error from the previous two iterations, the number of iterations for the integral error may be increased or decreased.

In one embodiment, equation (3) is simplified by setting $K_i$ and $K_d$ to zero, and combining equation (4). The resulting equation is as follows:

$$\Delta x_i^{(k)} = K_p(\overline{S}_i^{(k)} - S^*{}_i^{(k)})\quad\text{equation (5)}$$

The embodiments are described below using equation (5) for the sake of explanation.

Figure 4:
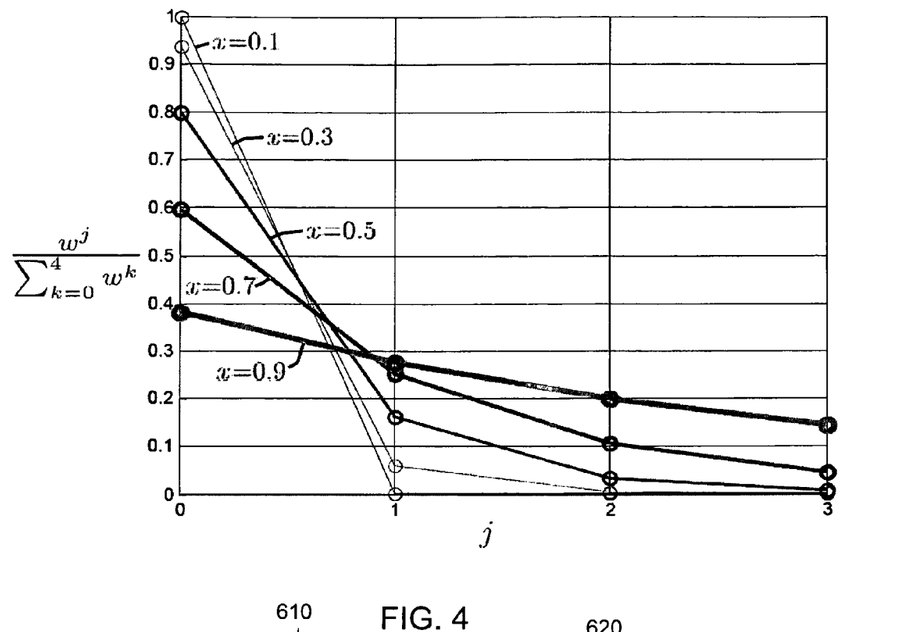
FIG. 4 is a graph illustrating weights for computing a current field state, according to one embodiment.

In one embodiment, the field state of previous iterations may be used in conjunction with equation (5) to reduce oscillation between iterations. For example, the field state $S_i^{(k)}$ of each cell may be represented by an exponential moving average of the internal energy density at the current iteration and n previous iterations, for example, as expressed in the following equation:

$$S_i^{(k)} = \frac{1}{\sum_{k=0}^{n} w_i^k} \sum_{j=0}^{n} w^j U_i^{(k-j)} \quad\text{equation (6)}$$

where $U_i$ represents internal energy density of the ith cell, $w_i$ represents weights given to the internal energy density computed at the current and previous iterations. Equation (6) takes into account the field states in previous iterations of the HCA algorithm and thereby gives each cell a memory of its previous states. The weights are expressed in the following equation:

$$w_i = (x_i - x_{min})^2 \quad\text{equation (7)}$$

where $x_{min}$ indicates the minimum density allowed. Ideally the $x_{min}$ is zero but this value is fixed to a small value (e.g., 0.05) to avoid computational issues. FIG. 4 is a graph illustrating the relative weights $$\frac{w^j}{\sum_{k=0}^{4} w_i^k}$$

given to the internal energy of ith cell at current (j=0) and previous iterations (j=1 to j=3) when n is set to 4.

After updating the distribution of material for all cells, the process proceeds to check whether a predetermined termination criteria is satisfied 350. For example, the convergence of parameters in the design of the structure may be checked. That is, the termination criteria include the difference between a parameter in current iteration and a parameter in a next iteration falling below a threshold. If the criteria are not satisfied, the process returns to the step 320 of performing the structural analysis of the structure using the FEA engine 320. If the criteria are satisfied, the final design is output 360 from the structure designer 110.

In one embodiment, the HCA algorithm designs structures within the constraints of the total mass of the structure. The total mass of the structure is correlated with the production cost of the structure. Therefore, the total mass of the structure may be constrained to generate the design of the structure that satisfies cost constraints. The internal energy stored in the structure, however, is directly correlated with the mass of the structure. The higher the target internal energy, the lower the mass of the structure and vice versa. Therefore, to determine an acceptable final mass of the structure, a target internal energy must be determined.

One way of finding this target internal energy is to iterate the HCA algorithm and adjust the target internal energy until the mass constraint is satisfied. The target internal energy for the (k+1)th iteration of the HCA algorithm can be expressed as:

$$S^{*(j+1)} = S^{*(j)} \left( \frac{M_f^{(k+1)}}{M_f^*} \right) \quad\text{equation (8)}$$

where $M^*_f$ is a target fractional mass. The initial target field state $S^{*(0)}$ is the average field state of all cells in the kth iteration. The fractional mass $M_f$ of the structure is defined as follows:

$$M_f = \frac{\sum_{i=1}^{N} x_i}{\sum_{i=1}^{N} 1} \quad\text{equation (9)}$$

where N represents the total number of cells in the structure. The fractional mass $M^f$ indicates the fraction of mass relative to the mass of initial design having full density cells and is set by the user. The fractional mass $M_f$ is proportional to the actual mass of the structure. When the fractional mass $M_f$ of the structure at the kth iteration of the HCA algorithm satisfies the target mass $M^*_f$ of the structure, the HCA algorithm is terminated. In this way, the final design of the structure satisfies the mass constraint.

Crashworthiness Design Based on Performance Constraints

Crashworthiness design of a structure may be limited by one or more factors. For example, the crashworthiness design may involve limiting of the displacement of the structure, reaction forces of the structure or the strain in the structure. If the displacement of the structure is excessive, passengers may experience acceleration that may injure the passengers or result in failure or buckling of the structure during the collusion. The reaction forces generated during the collision may also need to be constrained because high reaction forces may cause permanent damage to a vehicle. The strain may also need to be limited because excessive strain will cause the material to crack or fail and no longer withstand the load. The HCA algorithm may be applied to generate the designs of structures satisfying such predetermined performance constraints.

Figure 5:
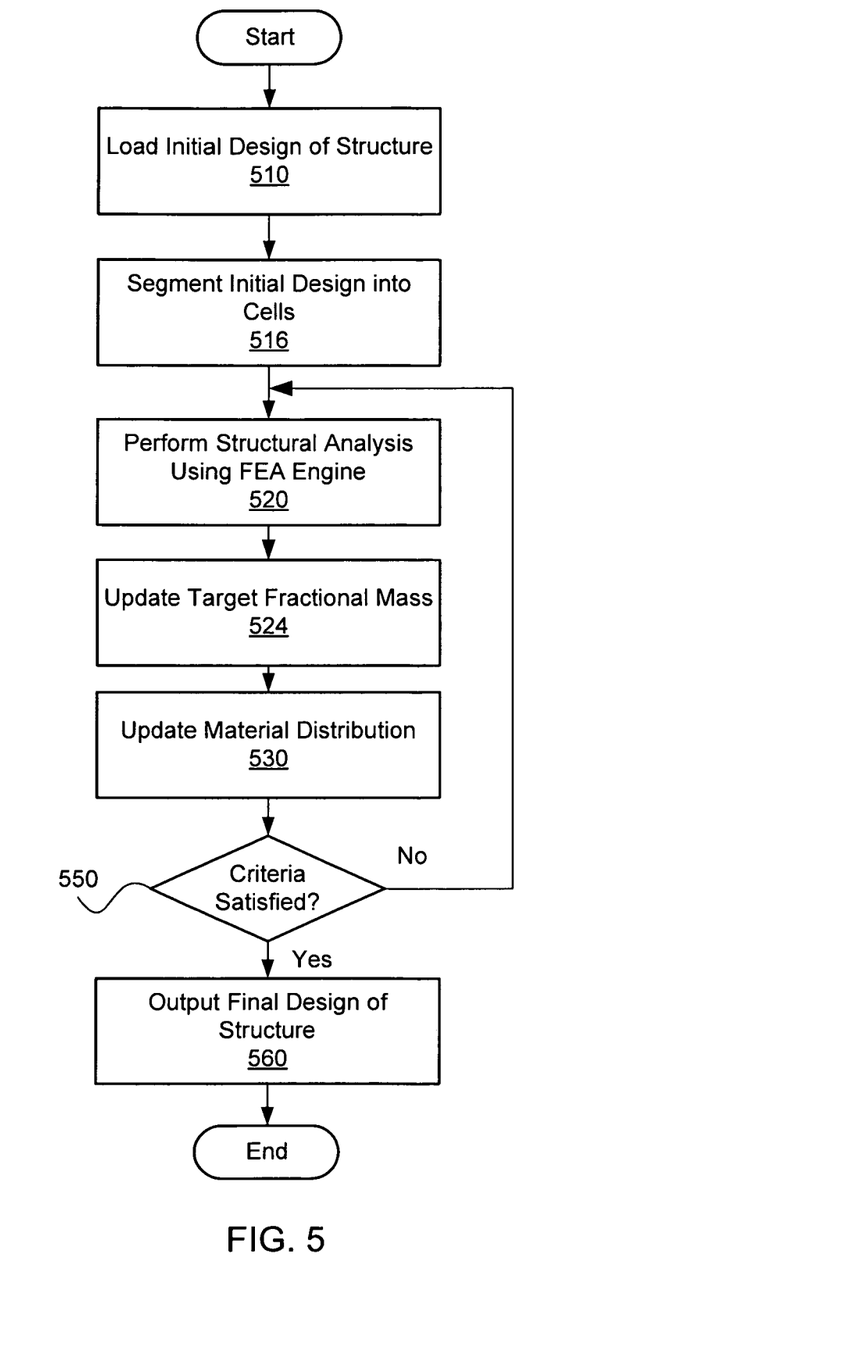
FIG. 5 is a flow chart illustrating a method of designing a structure subject to performance constraints, according to one embodiment.

FIG. 5 is a flow chart illustrating a method of designing a structure to satisfy the predetermined performance constraints, according to one embodiment. The steps 510, 516, 520, 530, 550 and 560 in FIG. 5 are substantially the same as the steps 310, 316, 320, 530, 550 and 560 in FIG. 3, respectively. Therefore, the description of these steps is omitted herein. The only step added in FIG. 5 compared to FIG. 3 is the step 524 of updating the target fractional mass. Specifically, by updating the target fractional mass, the performance constraints of the structure may be adjusted while achieving a target optimization objective (e.g., even distribution of the internal energy density across the structure). In the following, the structures are designed to satisfy one of the three performance constraints: (i) a maximum displacement constraint, (ii) a maximum reaction force constraint, and (iii) a maximum strain constraint.

In one embodiment, the maximum displacement constraint is imposed as a performance constraint on the design of the structure. In this embodiment, a control-based strategy is used to determine the amount of change in the target fractional mass. Specifically, an error $e_{DC}$ is defined as follows:

$$e_{DC} = \frac{d_{max} - d^*_{max}}{d^*_{max}} \qquad \text{equation (10)}$$

where $d_{max}$ is the maximum displacement of the structure, and $d^*_{max}$ is a target displacement set to satisfy design requirements. The reduction of the target fractional mass in step 524 in current iteration of the HCA algorithm is expressed as follows:

$$\Delta M^*_f = (K_{DC}\bar{x})e_{DC} \qquad \text{equation (11)}$$

where $K_{DC}$ is a proportionality constant for displacement constraint, and $\bar{x}$ is a density scaling parameter indicating the portions of cells that is either void of filled as described below in detail.

The global stiffness of the structure in terms of maximum displacement is difficult to determine when the cells are partly filled with material (that is, $0<x_i<1$). Therefore, in one embodiment, larger changes in the fractional mass are allowed as the design converges using the HCA algorithm, and each cell moves toward being a void ($x_i=0$) or being fully filled with material ($x_i=1$). The scaling parameter $\bar{x}$ is defined as follows:

$$\bar{x} = \frac{\sum_{i=1}^{n} x \Big|_{x > x_{min}}}{\bar{n}} \qquad \text{equation (12)}$$

where $\bar{n}$ represents the number of cells that have design variable $x_i$ greater than $x_{min}$.

Although the maximum displacement and the target fractional mass have approximately quadratic relationship for a structure where most of its cells have the design variable $x_i$ of 0 or 1, a linear relationship is approximated for small changes in the fractional mass during the updating of the target fractional mass (e.g., $\Delta M^*_f=0.1$) because the maximum allowable change of the design variable $\Delta x_{max}$ is 0.1 for numerical stability in the FEA. By defining the reduction of the target fractional mass as a function of the scaling parameter $\bar{x}$ that indicates the portion of cells in the structure that is either void of fully filled, an efficient convergence to optimized design of the structure can be achieved. As the iteration of the HCA algorithm proceeds and approaches the final structure exhibiting the desired force-displacement behavior, the permitted change in the target fractional mass may be increased. By changing the target fractional mass (and hence the total mass), the force and displacement constraints can be accommodated.

In one embodiment, the maximum reaction force constraint is imposed as a performance constraint on the design of the structure. The reaction force generated during a contact between two structures is also directly correlated with the mass of the structure and the global stiffness of the structure. Therefore, the methodology for controlling the reaction force is again based on finding the appropriate mass of the structure. Similar to the embodiment of imposing the maximum displacement constraint as set forth above, the reaction force constraint is applied globally by penalizing the amount of material needed for the structure. Specifically, the threshold mass of the structure is lowered until the maximum reaction force is reached. A control-based strategy is also used to adjust the target fractional mass $M^*_f$ to control the maximum reaction force in the structure.

An error for maximum reaction force $e_{FC}$ is quantified by integrating the normalized error between the actual force-displacement $F_r(d)$ of the structure and a target set of forces applied to the structure $F_r^*(d)$ as expressed by the following equation:

$$e_{FC} = \int_{d_i}^{d_f} \left( \frac{F_r(d) - F_r^*(d)}{F_r^*(d)} \right) dd \qquad \text{equation (13)}$$

where $d_i$ is the initial displacement of the structure and $d_f$ is the final displacement of the structure. The reduction of the target fractional mass in step 524 in current iteration of the HCA algorithm is expressed as follows:

$$\Delta M^*_f = (K_{FC}\bar{x})e_{FC} \qquad \text{equation (14)}$$

where KFC is a scale parameter employed to improve convergence, and $\bar{x}$ is a scale parameter that indicates the portion of cells that is either void of filled.

In one embodiment, the maximum strain constraint is imposed as a performance constraint on the design of the structure. The structure designer 110 may generate the design of a structure that maximizes the energy absorption of the structure while not exceeding a strain level in any parts of the structure during a collision. If a cell is determined as having largest strain that exceeds predetermine maximum strain, the mass of the material in the cell is increased. By increasing the material in the cell, the overall level of strain in the cells is decreased.

Figure 6:
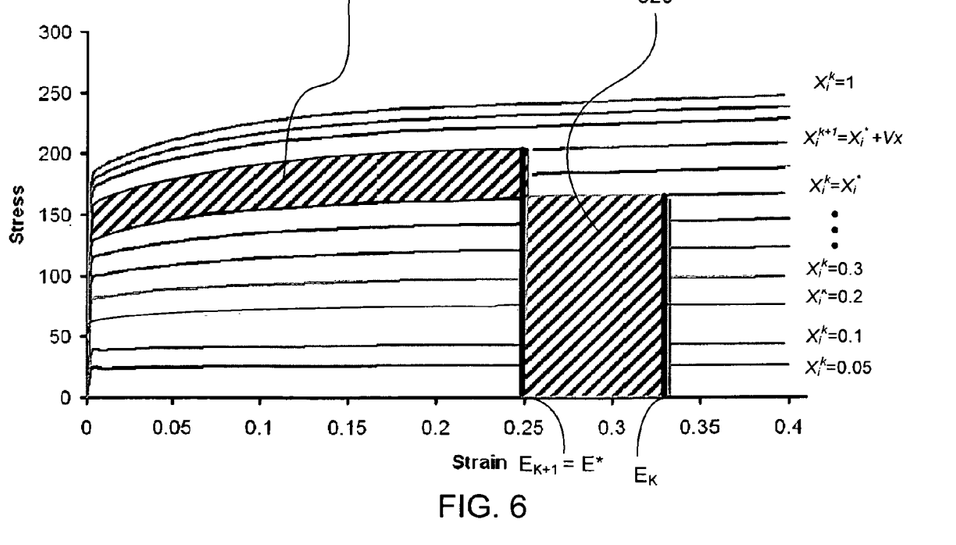
FIG. 6 is a diagram illustrating stress-strain curves for varying densities of material, according to one embodiment.

FIG. 6 is a diagram illustrating stress-strain curves for varying design variables $x_i$ (relative density in this case) of the material in a cell, according to one embodiment. At kth iteration of the HCA algorithm, the density variable is $x_i^*$ and the maximum strain in the ith cell is determined as $E_K$. By increasing the design variable from $x_i^k = x^*_i$ to $x_i^{k+1} = x_i^* + \Delta x$, the maximum strain in the ith cell is reduced to a target strain $E_{k+1} = E^*$. Vx may be determined by computing a design variable $x_i^{k+1}$ where the amount of additional internal energy (represented by hashed area 610) stored in the cell by increasing the design variable to $x_i^* + Vx$ corresponds to the internal energy (represented by hashed area 620) stored in the cell for undergoing excessive strain at the current density variable $x_i^*$. All design variables of the cells in the structure is updated in this manner to reduce the maximum strain to a target strain $E^*$.

The adjustment of the design variable $x_i$ may be performed in the step 530 of updating the material distribution. Specifically, the material distribution rule is expressed by the following equation to achieve (i) uniform distribution of the internal energy, and (ii) the strain constraint:

$$\Delta x_i = \omega_1 \Delta x_1^i + \omega_2 \Delta x_2^i \qquad \text{equation (15)}$$

where $\Delta x_1^{(k)} = K_P(\bar{S}_i^{(k)} - S^*_i{}^{(k)})$ represents material distribution update for uniform internal energy distribution, $$\Delta x_2^{(k)} = K_s \left( \frac{\varepsilon^* - \varepsilon_i^*}{\varepsilon^*} \right)$$

represents material distribution update for the strain constraint, $K_s$ is a constant representing a proportionality constant for strain, $\omega_1$ and $\omega_2$ represent weighted values represent how much weight should be given to uniform distribution of the internal energy and the strain constraint, respectfully. $\varepsilon^*$ represents a target strain value or a maximum allowable strain in the structure, and $\epsilon_i^*$ represents the strain value at the present iteration.

The weighted values $\omega_1$ and $\omega_2$ are fixed during the iterations. If the final design of the structure is not satisfactory, however, a new design may be obtained by performing another set of iterations based on different weights $\omega_1$ and $\omega_2$. The user may change the weights $\omega_1$ and $\omega_2$ based on experience to obtain a desired final design.

Designing of Structures Fabricated by Extrusion Method

An extrusion manufacturing process is often employed as a method for fabricating a structure with reduced cost. In the extrusion manufacturing process, material is forced through a die using either a mechanical or hydraulic press. The structure fabricated by extrusion has a cross-section corresponding to the shape of the die. The structures fabricated by the extrusion process often require minimal secondary machining, which reduces the overall cost associated with fabricating the structures. The design of the structure manufactured by the extrusion process is different in that the two-dimensional cross-section of the structure must be defined instead of a three-dimensional topology of the structure.

Figure 7:
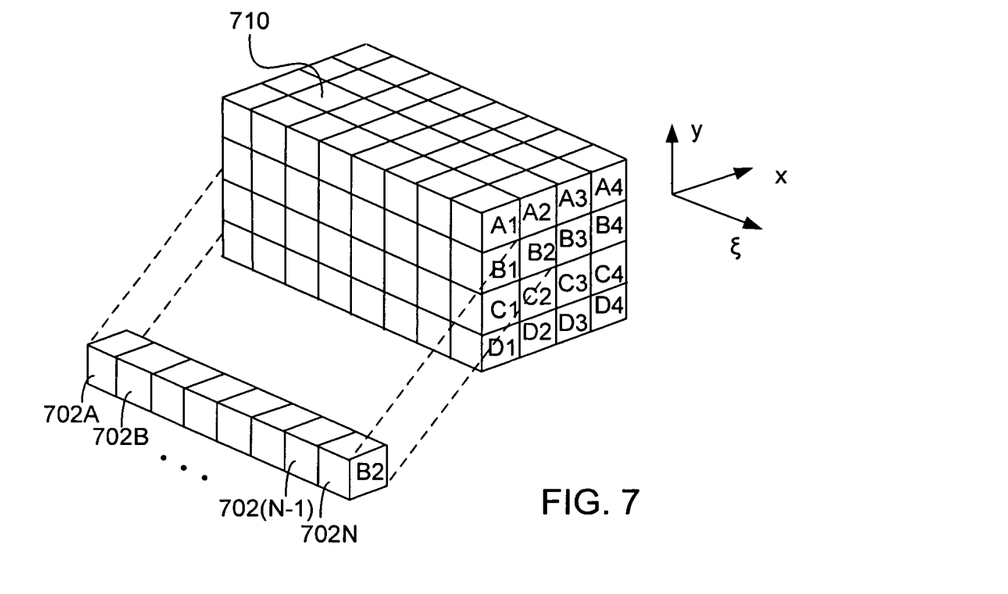
FIG. 7 is a diagram illustrating a discretized three-dimensional structure for fabrication by an extrusion method, according to one embodiment.

In one embodiment, the HCA algorithm is modified to generate designs with a constant cross-section in a direction perpendicular to the direction of extrusion. FIG. 7 is a diagram illustrating a discretized three-dimensional structure 710 for fabrication by an extrusion method, according to one embodiment. The structure 710 is fabricated by extruding the material in direction $\xi$. In the extrusion method, the cross-section of the structure 710 must be retained along the direction of extrusion $\xi$. Therefore, the process of designing the structure 710 is reduced to a two dimensional problem of assigning design variables $x_i$ to the cross-sectional columns A1 through D4.

Figure 8:
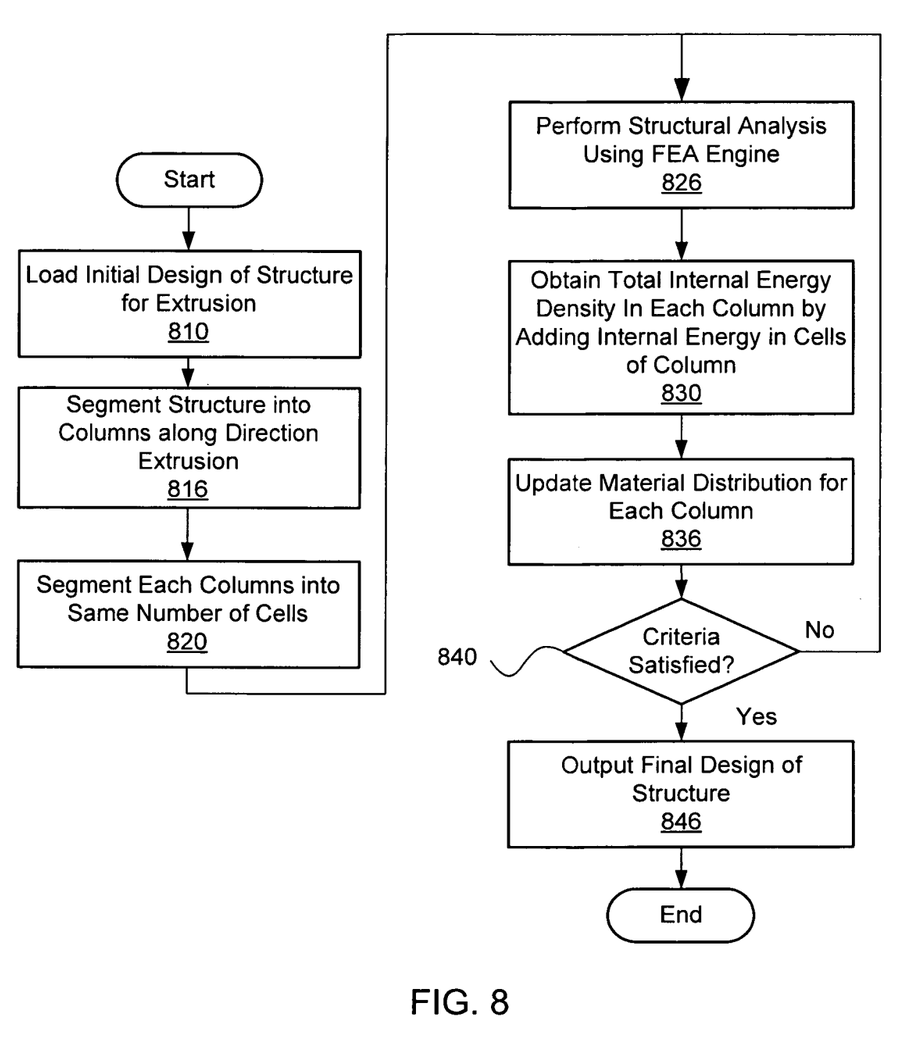
FIG. 8 is a flow chart illustrating a method of designing a structure for fabrication by an extrusion method, according to one embodiment.

FIG. 8 is a flow chart illustrating a method of designing the structure 710 to be fabricated by the extrusion method, according to one embodiment. First, the initial design of the structure 710 is loaded 810. The structure 710 is then segmented 816 into columns (for example, columns A1 through D4) along the direction of extrusion $\xi$. Each column A1 through D4 is then segmented 820 into multiple cells (for example, column B2 is segmented to cells 702A through 702N).

Figure 9:
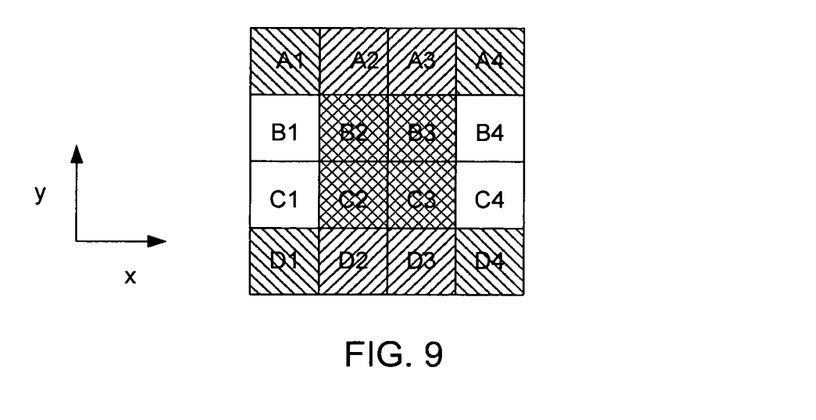
FIG. 9 is a diagram illustrating the distribution of an internal energy density in a column of the structure of FIG. 7, according to one embodiment.

The FEA engine 230 performs 826 the structural analysis of the structure 710 applied with a load to compute the internal energy density in each cells of the structure 710. Then, the internal energy densities in the cells of a column are added to obtain 830 a total internal energy density in each column for the structure 710. Referring to FIG. 7, for example, the internal energy densities in the cells 702A through 720N is added to obtain the total internal energy density of column B2. The total internal energy densities in other columns are obtained in the same manner. The total internal energies of the columns A1 through D4 are illustrated in FIG. 9 as blocks with different patterns.

The cellular automata engine 240 then updates 836 the distribution of materials in each block A1 through D4 to evenly distribute the total internal energy density across the columns A1 through D4. The distribution of materials is performed in two-dimension.

Then the updated design is analyzed to confirm if predetermined termination criteria are satisfied 840. In one embodiment, the updated design is checked against the design in a previous iteration for differences in a parameter of the designs after updating the material distribution. If the change in the parameter is below a threshold, it is determined that the termination criteria are satisfied. If the termination criteria are satisfied, the process proceeds to output 846 the final design of the structure 710. If the termination criteria are not satisfied, the process returns to step 826.

Designing of Stamped Structures

In one embodiment, the HCA algorithm is used for designing a stamped structure with varying structural thickness. Like other examples described above, the goal of the design may be to evenly distribute the internal energy density across the stamped structure as much as possible. If the stamped structure has a low internal energy density at one portion, the thickness is reduced to increase the internal energy density at the same portion. In contrast, if the stamped structure has a high internal energy density at a portion, the thickness is increased to reduce the internal density at the same portion. The HCA algorithm adjusts the thickness profile of the stamped structure to evenly distribute the internal energy density across the stamped structure.

The method of designing the stamped structure using the HCA algorithm is essentially the same as the method described above with reference to FIG. 3. The major difference in designing the stamped structure compared to the embodiment of FIG. 3 is that the thickness (t) of the cell is used as the design variable instead of density ($\rho$), elastic modulus (E), yield stress ($\sigma_Y$) or strain-hardening modulus ($E_h$). Specifically, the thickness (t) is updated in step 330 using the following equation:

$$\Delta t_i^{(k)} = K_P(\overline{U}_i^{(k)} - U^*{}_i^{(k)}) \qquad \text{equation (16)}$$

where $\Delta t_i^{(k)}$ is the change of thickness in ith cell at kth iteration of the HCA algorithm, $K_p$ is a proportional control gain, $\overline{U}_i^{(k)}$ is the internal energy density of ith cell, and $U^*{}_i^{(k)}$ is a target internal energy density of the cell. The target internal energy density $U^*{}_i^{(k)}$ may be updated at each iteration based on the internal energy density of each cell.

Various modifications to the equations and processes may be made. For example, although-above embodiments were described mainly with reference to a design variable $x_i$ having values not below 0 and not above 1, other unscaled variables having values beyond 0 and 1 may also be used. Further, actual mass of the cell may be used instead of the factional mass when performing the HCA algorithm.

Although the present invention has been described above with respect to several embodiments, various modifications can be made within the scope of the present invention. Accordingly, the disclosure of the present invention is intended to be illustrative, but not limiting, of the scope of the invention, which is set forth in the following claims.

What is claimed is:

1. A computer-implemented method of designing a structure representing a physical object, comprising:
   (a) segmenting an initial design of the structure into a plurality of cells;
   (b) computing a field state of the plurality of cells in the structure based on a finite element analysis;
   (c) performing cellular automata computation by:
       (c1) reducing a total mass or a target fractional mass of the structure required to satisfy a maximum reaction force at a cell according to an amount determined by an error $e_{FC}$ defined by following equation:

$$e_{FC} = \int_{d_i}^{d_f} \left( \frac{F_r(d) - F_r^*(d)}{F_r^*(d)} \right) dd$$

where $F_r(d)$ represents an actual force-displacement of the structure, $F_r^*(d)$ represents a target set of forces applied to the structure, d represents a displacement of the structure, $d_i$ represents an initial displacement of the structure and $d_f$ represents a final displacement of the structure, and (c2) updating the design variable based on the total mass or the target fractional mass and a material distribution update rule to generate an updated design of the structure, the material distribution update rule changing the design variable of each cell to converge the field state of each cell towards a target field state of each cell;

(d) repeating steps (b) and (c) responsive to the updated design not satisfying a terminating condition; and (e) outputting the updated design of the structure responsive to the updated design satisfying the terminating condition.

2. The method of claim 1, wherein the design variable is a material density of the cell or a thickness of the cell.

3. The method of claim 1, wherein the finite element analysis comprises transient nonlinear finite element analysis.

4. The method of claim 1, wherein the field state of the cell comprises an internal energy density of the cell responsive to applying a load to the structure, a difference between the design variable before updating and the design variable after updating proportional to a difference between an internal energy density of the cell and a target energy density of the cell.

5. The method of claim 1, wherein computing the field state of the cell comprises weighting and adding a field state of the cell in a previous iteration.

6. A structure designing device for generating a design of a structure representing a physical object, comprising:
a processor; and
a memory coupled to the processor and configured to store:
a cell divider configured to segment an initial design of the structure into a plurality of cells;
a finite element analysis engine configured to compute field states of the plurality of cells of a design of the structure in a current iteration by a finite element analysis; and
a cellular automata engine configured to perform cellular automata computation by (i) reducing a total mass or a target fractional mass of the structure required to satisfy a maximum reaction force at a cell according to an amount determined by an error $e_{FC}$ defined by following equation:

$$e_{FC} = \int_{d_i}^{d_f} \left( \frac{F_r(d) - F_r^*(d)}{F_r^*(d)} \right) dd$$

where $F_r(d)$ represents an actual force-displacement of the structure, $F_r^*(d)$ represents a target set of forces applied to the structure, d represents a displacement of the structure, $d_i$ represents an initial displacement of the structure and $d_f$ represents a final displacement of the structure, and (ii) updating the design variable based on the total mass or the target fractional mass and a material distribution update rule to generate an updated design of the structure for a next iteration subsequent to the current iteration, the material distribution update rule changing the design variable of each cell to converge the field state of each cell towards a target field state of each cell over a plurality of iterations, the updated design of the structure provided to the finite element analysis engine to compute a field state in the next iteration, cellular automata engine configured to output the updated design of the structure responsive to the updated design satisfying a terminating condition.

7. The structure designing device of claim 6, wherein the design variable is a material density of the cell or a thickness of the cell.

8. The structure designing device of claim 6, wherein the finite element analysis comprises a transient nonlinear finite element analysis.

9. A non-transitory computer readable storage medium storing instructions thereon for designing a structure representing a physical object, the instructions when executed by a processor cause the processor to:

(a) segment an initial design of the structure into a plurality of cells;

(b) compute a field state of the plurality of cells in the structure based on a finite element analysis;

(c) perform cellular automata computation by:
(c1) reducing a total mass or a target fractional mass of the structure required to satisfy a maximum reaction force at a cell according to an amount determined by an error $e_{FC}$ defined by following equation:

$$e_{FC} = \int_{d_i}^{d_f} \left( \frac{F_r(d) - F_r^*(d)}{F_r^*(d)} \right) dd$$

where $F_r(d)$ represents an actual force-displacement of the structure, $F_r^*(d)$ represents a target set of forces applied to the structure, d represents a displacement of the structure, $d_i$ represents an initial displacement of the structure and $d_f$ represents a final displacement of the structure, and (c2) updating the design variable based on the total mass or the target fractional mass and a material distribution update rule to generate an updated design of the structure, the material distribution update rule changing the design variable of each cell to converge the field state of each cell towards a target field state of each cell;

(d) repeat instructions causing (b) and (c) responsive to the updated design not satisfying a terminating condition; and (e) output the updated design of the structure responsive to the updated design satisfying the terminating condition.

10. The computer readable storage medium of claim 9, wherein the design variable is a material density of the cell or a thickness of the cell.

11. The computer readable storage medium of claim 9, wherein the finite element analysis comprises transient nonlinear finite element analysis.

12. The computer readable storage medium of claim 9, wherein the field state of the cell comprises an internal energy density of the cell responsive to applying a load to the structure, a difference between the design variable before updating and the design variable after updating proportional to a difference between an internal energy density of the cell and a target energy density of the cell.

13. The computer readable storage medium of claim 9, wherein instruction to compute the field state of the cell comprises instructions to weight and add a field state of the cell in a previous iteration.

* * * * *

UNITED STATES PATENT AND TRADEMARK OFFICE
CERTIFICATE OF CORRECTION

PATENT NO. : 8,880,380 B2
APPLICATION NO. : 12/340192
DATED : November 4, 2014
INVENTOR(S) : Kishore Krishna Pydimarry et al.

It is certified that error appears in the above-identified patent and that said Letters Patent is hereby corrected as shown below:

In the claims

Column 12, Line 60, Claim 1

Please delete " $e_{FC} = \int_{d_i}^{d_f} \left( \frac{F_r(d) - F_r^*(d)}{F_r^*(d)} \right) dd$ " and insert -- $e_{FC} = \int_{d_i}^{d_f} \left( \frac{F_r(d) - F_r^*(d)}{F_r^*(d)} \right) dd$ --

Column 13, Line 47, Claim 6

Please delete " $e_{FC} = \int_{d_i}^{d_f} \left( \frac{F_r(d) - F_r^*(d)}{F_r^*(d)} \right) dd$ " and insert -- $e_{FC} = \int_{d_i}^{d_f} \left( \frac{F_r(d) - F_r^*(d)}{F_r^*(d)} \right) dd$ --

Column 14, Line 25, Claim 9

Please delete " $e_{FC} = \int_{d_i}^{d_f} \left( \frac{F_r(d) - F_r^*(d)}{F_r^*(d)} \right) dd$ " and insert -- $e_{FC} = \int_{d_i}^{d_f} \left( \frac{F_r(d) - F_r^*(d)}{F_r^*(d)} \right) dd$ --

Signed and Sealed this
Twenty-fourth Day of November, 2015

Michelle K. Lee
*Director of the United States Patent and Trademark Office*